United States Patent [19]

Distin, Jr. et al.

[11] Patent Number: 4,584,904
[45] Date of Patent: Apr. 29, 1986

[54] EPICYCLIC TRANSMISSION HAVING FREE ROLLING ROLLER DRIVING ELEMENTS

[75] Inventors: Robert G. Distin, Jr., Louisville; James E. Shaffer, Longmont, both of Colo.

[73] Assignee: Advanced Energy Concepts '81, Limited, Boulder, Colo.

[21] Appl. No.: 362,195

[22] Filed: Mar. 26, 1982

[51] Int. Cl.[4] .................. F16H 1/28; F16H 21/12; F16H 55/06; F16H 15/00
[52] U.S. Cl. ........................... 74/804; 74/462; 74/465; 74/202; 74/206; 74/63
[58] Field of Search ............... 74/804, 805, 465, 202, 74/640, 63, 206, 462; 418/61 B, 61 A, 61 R

[56] References Cited

U.S. PATENT DOCUMENTS

| | | | |
|---|---|---|---|
| 606,158 | 6/1898 | Belanger | 74/805 |
| 1,634,453 | 7/1927 | Carroll | 74/805 |
| 1,706,180 | 3/1929 | Morrison | 74/798 |
| 1,773,568 | 8/1930 | Braren | 74/804 |
| 1,844,471 | 2/1932 | Johnson | 74/804 |
| 1,862,220 | 6/1932 | Johnson | 74/804 |
| 2,874,594 | 2/1959 | Sumdt | 74/805 |
| 3,094,880 | 6/1963 | Maroth | 74/800 |
| 3,439,562 | 4/1969 | Bickley | 74/804 |
| 3,472,097 | 10/1969 | Huska | 74/805 |
| 3,727,473 | 4/1973 | Bayer | 74/198 |
| 4,023,440 | 5/1977 | Kennington et al. | 74/805 |
| 4,078,454 | 3/1978 | Murakami et al. | 74/804 |
| 4,117,746 | 10/1978 | Pierrat | 74/804 |
| 4,271,726 | 6/1981 | Ryffel | 74/805 |
| 4,282,777 | 8/1981 | Ryffel et al. | 74/465 |

FOREIGN PATENT DOCUMENTS

| | | | |
|---|---|---|---|
| 0020314 | 12/1980 | European Pat. Off. | 74/804 |
| 348514 | 3/1921 | Fed. Rep. of Germany | |
| 512604 | 6/1927 | Fed. Rep. of Germany | 74/804 |
| 600469 | 7/1934 | Fed. Rep. of Germany | 74/804 |
| 859552 | 10/1952 | Fed. Rep. of Germany | 74/804 |
| 1933143 | 1/1971 | Fed. Rep. of Germany | 74/804 |
| 1957530 | 5/1971 | Fed. Rep. of Germany | 74/804 |
| 2534476 | 2/1976 | Fed. Rep. of Germany | 74/804 |
| 24338 | 12/1930 | Netherlands | 74/804 |
| 303709 | 1/1929 | United Kingdom | |

OTHER PUBLICATIONS

"New Drive Design: No Teeth", pp. 16-17, *Design Engineering*, Jan., 1982.
"Toothless Gear Draws Media Attention", p. 60, *Mechanical Engineering*, Jan. 1982.
"Planetary Gearing", *Mechanical Engineering*, Kudryartser, Moscow, 1966.
"Planetary, Wave, and Combination Gearing in Construction and Roadbuilding", Volkov, Moscow, 1968.
"Planetary Gearing with Eccentroid Engagement", *Mashgiz*, Pannikov, 1948.

*Primary Examiner*—Rodney H. Bonck
*Assistant Examiner*—Michael D. Bednarek
*Attorney, Agent, or Firm*—Sughrue, Mion, Zinn, Macpeak, and Seas

[57] ABSTRACT

A speed reducing transmission includes roller driving elements operating to transmit torque between opposed trochoidally formed surfaces. The device may have one or multiple reduction stages and may be either counterbalanced or counterweighted to achieve dynamic balance. The opposed surfaces are provided as conjugate epitrochoidal and hypotrochoidal gear elements, while the rollers are simple cylinders maintained suitably spaced by means of roller cages or retainers.

27 Claims, 9 Drawing Figures

4,584,904

EPICYCLIC TRANSMISSION HAVING FREE ROLLING ROLLER DRIVING ELEMENTS

BACKGROUND OF THE INVENTION

Speed reducing mechanisms of the epicyclic type are well known mechanical transmission mechanisms, which typically include an orbiting internal pinion gear which is provided with teeth on its external periphery. The number of teeth on the pinion gear is typically one or a few less than the number of teeth on an outer ring gear, such that a large speed reduction can be obtained between the orbital input and an output appropriately coupled to the internal pinion gear.

Such epicyclic transmissions have been provided in single, double and multiple stages in order to obtain any desired speed transmission ratio. However, gear systems of the type just described suffer from a number of disabilities. Firstly, such gearing systems are not particularly efficient in terms of the amount of torque which can be transmitted, and secondly, the gears are expensive to produce, inasmuch as each toothed member must be precisely cut. Such devices can transmit only a limited amount of torque due to the fact that only some small fraction of the gear teeth are in contact at any given instant. It will be appreciated that it is impossible to design an internal pinion type speed reducing mechanism so that a large percentage of the torque transmitting elements (teeth) are in torque transmitting engagement at all times.

SUMMARY OF THE INVENTION

The present invention relates to a speed reduction transmission mechanism wherein the drive system includes a pair of conjugate epitrochoidal and hypotrochoidal surfaces disposed on driving and driven disks, with a plurality of rolling elements disposed between and transmitting torque from driving to driven member. The rolling elements are provided in the form of cylindrical rollers, which rollingly transmit torque while remaining engaged with the opposed trochoidal surfaces at all times. The hypotrochoidal and epitrochoidal surfaces have a plurality of "lobes" thereon, where the number of hypotrochoidal "lobes" is greater by two than the number of epitrochoidal lobes. The number of rollers is equal to the number of epitrochoidal lobes, plus one. The speed reduction ratio obtainable with the present invention depends upon the number of reduction stages, while the speed reduction for a given stage is dependent only upon the numbers of lobes of the opposed surfaces. The basic mechanical movement employed by the device is one in which a member is made to orbit about its axis while rotating at a reduced speed, while the rolling torque transmitting rollers circulate following a substantially trochoidal path while maintaining in contact with the trochoidal surfaces of the member and a further gearing element.

DETAILED DESCRIPTION OF THE PREFERRED EMBODIMENTS

Figure 1:
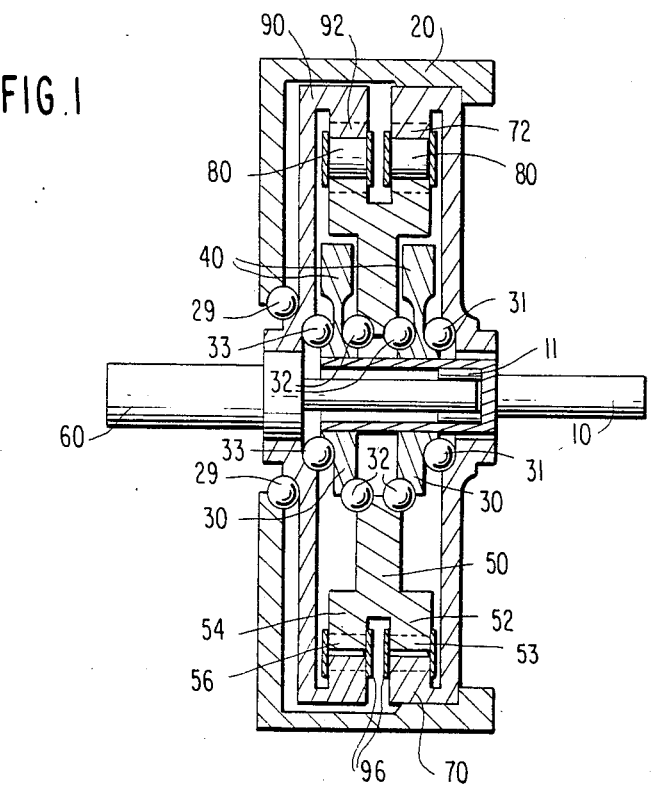
FIG. 1 is a sectional view of a two stage speed reduction device according to the present invention.

Turning now to the drawing figures, and in particular to FIG. 1, a first example of a speed reducing mechanism according to the invention is illustrated. The present transmission achieves a double speed reduction by means of two conjugate sets of epitrochoidal and hypotrochoidal surfaces, as will become more apparent hereafter.

An input shaft 10 is received within a stationary housing 20 and is journaled for rotation therein by means of roller bearings 11 which separate the input shaft 10 from an extension of an output shaft 60. The shaft 10 includes a pair of eccentric portions 30, which may be formed integrally with or separately from the shaft. Also provided on the shaft opposite the most highly eccentric portion of the cams 30 are a pair of counterweights 40, which will be described in more detail hereafter. Journaled upon the eccentric cams 30 by means of a ring of bearings 32 or the like is an idler member 50. As is apparent from FIG. 1, as the input shaft 10 is rotated, the idler member 50 is made to undergo orbital motion at a speed determined by that of the input shaft. Due to the presence of the intermediate bearings 32, the idler 50 is capable of rotation about its axis independently of the orbital motion imparted thereto by means of the shaft 10.

The idler 50 is a generally disk-shaped element which is bifurcated at its radially outer periphery to form two gear elements 52, 54. The outer surface of the gear 52 is formed with trochoidal curvature, as is a coacting, a conjugate gear element 70 which is in engagement with the former gear element by means of intermediate caged cylindrical rollers 80. In FIG. 1, the gear element 70 is suitably fixed to the housing 20, so as to form a stator therewith.

As noted, the surface of the stator 70 is formed with trochoidal curvature, conjugate to that of the gear element 52. By "conjugate" is meant that the curvature of these two surfaces are related in such a way that the rollers will be in substantially continuous contact with both surfaces. One method of producing conjugate epitrochoidal and hypotrochoidal surfaces is taught in copending patent application Ser. No. 313,442, filed Oct. 20, 1981 by the present inventors, the disclosure of which is hereby incorporated by reference. In FIG. 1, the gear element 52 may be provided with epitrochoidal curvature, while that of the stator is hypotrochoidal.

Figure 4:
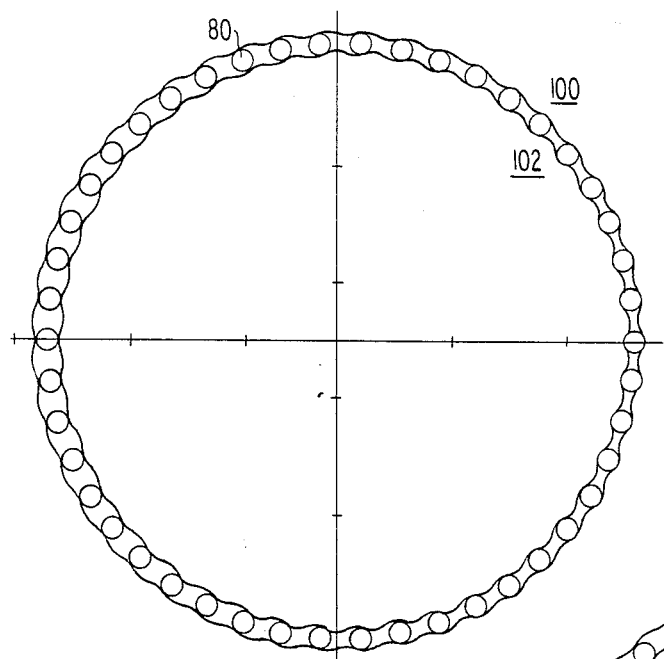
FIGS. 4, 5 and 6 are schematic views of the opposed hypotrochoidal and epitrochoidal surfaces according to the invention, with the rollers shown engaged therebetween.
Figure 5:
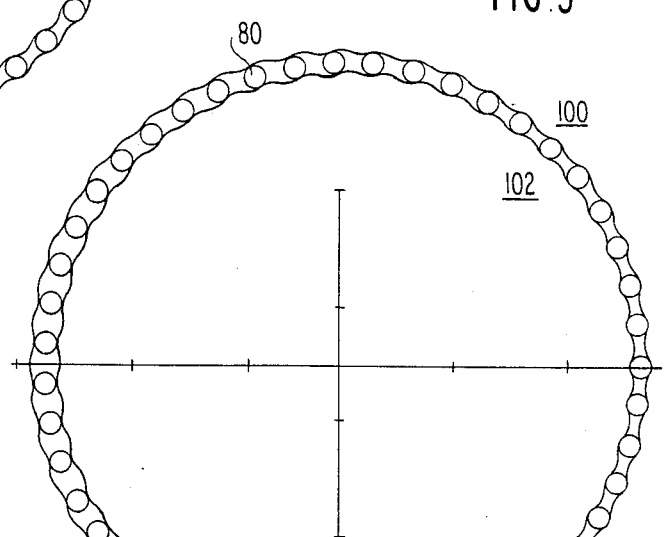
Figure 6:
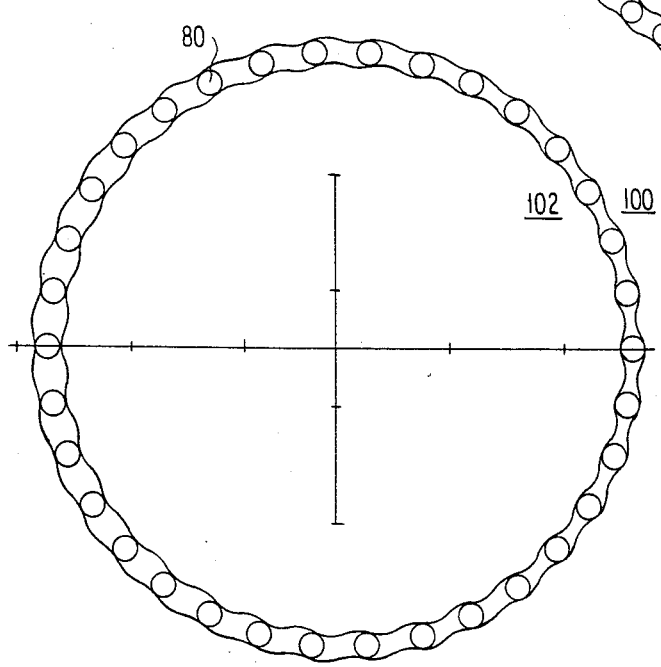

FIGS. 4, 5 and 6 schematically show a hypotrochoidal outer member 100 engaged with an inner, epitrochoidal gear element 102 by means of the intermediate rollers 80. FIGS. 4, 5 and 6 show the cases where the number of intermediate rollers are 46, 47 and 34, respectively. The engagement between the stator 70 and the idler gear member 52 is similar to that shown in FIGS. 4 through 6, but may be different in terms of the actual numbers of lobes and roller elements. As can be seen from FIGS. 4–6, the positions of the rollers with respect to the trochoidally formed surfaces range from a position in which a roller is nearly entrained within opposed recesses of the gears, to a position where the roller passes over the confronting crests of the two gear elements. It will be observed from these figures that as the inner member is made to orbit about its axis, assuming that the outer member is stationary, it will be caused to rotate about its axis at a speed determined by the relative number of lobes on the two gears, as the rollers circulate, or rollingly engage both gear elements. Specific formulae for determining the output speed ratio will be presented hereafter.

Due to the engagement between idler gear member 52 and stator 70, the idler 50 will be caused to rotate about its own axis in a direction opposite that of the input rotation, at a reduced speed dependent upon the number of lobes on the opposed trochoidal surfaces, as noted above. The idler 50 rotates reversely to the input due to the fact that the stator member 70 has a greater pitch diameter and a larger number of trochoidal lobes than does the gear element 52. Since the first gear element 52 is integral with the second idler gear member 54, these two gears rotate/orbit as a unit.

As can be seen from FIG. 1, the second idler gear element 54 is in engagement with an output gear member 90 having a hypotrochoidally lobed surface 92, via an intermediate second set of caged cylindrical rollers 80. The surface 92 of the output gear 90 is formed substantially identically to the gear surface 72 of the idler 70, but the pitch diameter thereof is slightly larger, e.g., it contains one more hypotrochoidal lobe than does the stator surface 72. As the difference in the number of lobes within a conjugate set of hypotrochoidal and epitrochoidal elements is always equal to two, it will be appreciated that the surface 56 of the second idler gear element 54 has one more epitrochoidal lobe than does the surface 53 of the first idler gear 52. It should be noted that whether the stator or the output gear has the greater number of lobes is of no consequence, so that the arrangement could easily be the reverse of that just described.

Since the idler 50 is orbiting at a speed determined by the input shaft 10, and is rotating in the direction opposite thereto at a reduced speed, the output obtained at the gear 90 will be at a further reduced speed, in the direction opposite the input direction so long as the pitch diameter of the surface 92 times that of the surface 52 is less than the pitch diameter of the surface 72 times that of the surface 56.

The speed reduction ratio obtained with the device of FIG. 1 may be determined from the following formula:

$$\frac{\text{input speed}}{\text{output speed}} = \frac{1}{1 - \left(\frac{n_1 \cdot n_3}{n_2 \cdot n_4}\right)} \quad (1)$$

where:
 $n_1$ is equal to the number of hypotrochoidal lobes on the stator surface 72,
 $n_2$ equals the number of lobes on the coacting epitrochoidal idler surface 53,
 $n_3$ equals the number of lobes on the surface 56 of the epicycling idler 50, and
 $n_4$ equals the number of lobes on the output gear surface 92.

As an example, if the number of lobes of the trochoidal surfaces of the stator, first and second idler gears 52, 54 and output gear 90 are 17, 15, 16 and 18, respectively, it can readily be calculated from the above formula that the speed reduction ratio of the transmission is equal to $-135:1$, where the negative sign indicates that the output rotation is in the direction opposite that of the input. It goes without saying that the output speed ratio may be easily raised or lowered by merely replacing conjugate gear sets with others having different numbers of lobes formed thereon. For example, with any of the constructions illustrated in FIGS. 4 through 6, the output speed ratio could be made substantially higher.

As the pinion member 50 is driven in an orbital fashion by the cam members 30, the system developes a dynamic imbalance which must be effectively cancelled in order for the unit to be usable at high speeds. For this purpose, the counterweights 40 are provided on either side of the idler member 50, and as can be seen from FIG. 1, the counterweights may be made integral with the eccentric cams 30. The counterweights 40 are of course selected as regards their weight and radial length so as to dynamically balance the system. Since the counterweights are arranged opposite the cam members 30, it will be observed that they will always remain at a position opposite the point of maximum eccentricity of the idler 50. The counterweights, as well as the shaft 10 itself, are supported against the housing 20 by means of bearing elements 31, 32. The bearing elements 33 also serve to support the output gear 90 within the housing 20, along with a set of bearings 29.

As noted previously, the rollers 80 of the present embodiment are caged, in a manner similar to that commonly found in ball bearings or universal joints. In particular, a pair of annular cage elements are provided on either side of the sets of rollers. The purpose of the cage is to maintain the rolling elements 80 at prescribed distances from each other, and to this end, the cages are provided as simple circular disks having suitably sized apertures therein. The cage elements do not ordinarily act as torque transmitting elements, but merely allow the rollers to cooperate effectively with the respective gear surfaces. A more specific discussion of the interrelationships of the torque transmitting surfaces, the rollers and the cages will be presented hereafter.

Figure 2:
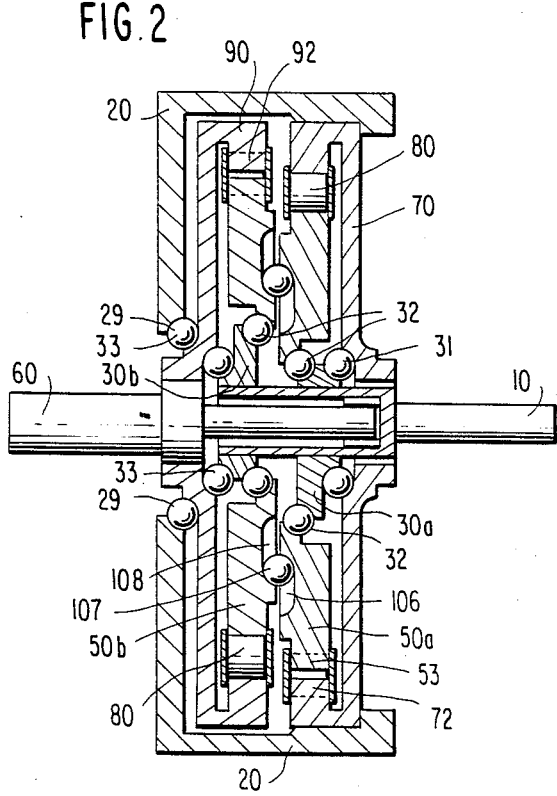
FIG. 2 is a sectional view of a speed reducer according to a second embodiment of the invention where either double or triple stage reduction can be achieved.

Shown in FIG. 2 is a second embodiment of the invention which is substantially similar to the first embodiment except that the transmission in FIG. 2 is counterbalanced instead of counterweighted. For ease of description, the elements in FIG. 2 have been numbered similarly to the like elements in FIG. 1.

In the embodiment of FIG. 2, the previously unitary idler 50 is divided into two separate disk elements 50a and 50b, which are driven 180° out of phase with respect to each other by means of eccentric cam members 30a, 30b provided on the input shaft 10. Since the first and second idler disks are maintained oppositely directed, the device of FIG. 2 is thus self-balancing, so that no counterweight elements are required.

Although the idler elements 50a, 50b orbit oppositely to each other, they are maintained rotationally coupled by means of a constant velocity coupling consisting of elements 106, 107 and 108. More specifically, each of the idler elements is provided with a series of circular recesses 106, 108, respectively, formed therein. Operating between the two idler elements and transmitting torque from one to the other are a series of balls 107, one for each opposed pair of recesses 106, 108. The diameter of the recesses is selected so that the coupling may accommodate the combined eccentricities of the cam elements 30a, 30b, as is seen in FIG. 2. It will be appreciated that the constant velocity coupling serves to join the members 50a, 50b for joint rotary movement, while allowing independent orbital movement. Constant velocity couplings such as the type shown in FIG. 2 are discussed in more detail in the above-noted copending application Ser. No. 313,442, and are thus not further discussed herein.

The embodiment of FIG. 2 otherwise operates identically to the FIG. 1 embodiment, with the first idler 50a being rotated while orbiting due to its engagement with the stator 70 through the rollers 80, while the idler member 50b rotates therewith while being in contact with the output gear 90. A double stage reduction is thus realized, and equation (1) given above is applicable to this embodiment.

It should be noted that the conjoint rotation of the idler members 50a, 50b is not necessarily required, as long as these members are maintained orbitally out of phase by 180°. Thus, the constant velocity coupling may be replaced, if desired, with opposed epitrochoidal and hypotrochoidal grooves, such as those found in the above-noted copending application. In this manner, a further speed reduction may be obtained between the idler member 50a and idler member 50b, so that the overall speed reduction ratio is made much larger. In this case, the embodiment of FIG. 2 should be regarded as a three stage reduction transmission, whose ratio may be determined by the following equation, which is analogous to equation (1).

$$\frac{\text{input speed}}{\text{output speed}} = \frac{1}{1 - \left(\frac{n_1 \cdot n_3 \cdot n_5}{n_2 \cdot n_4 \cdot n_6}\right)} \quad (2)$$

Where:

$n_1$ through $n_4$ are the same as above, and $n_5$ and $n_6$ are equal to the number of lobes on the opposed epitrochoidal and hypotrochoidal surfaces formed in the confronting surfaces of the idlers 50a, 50b, respectively.

Figure 3:
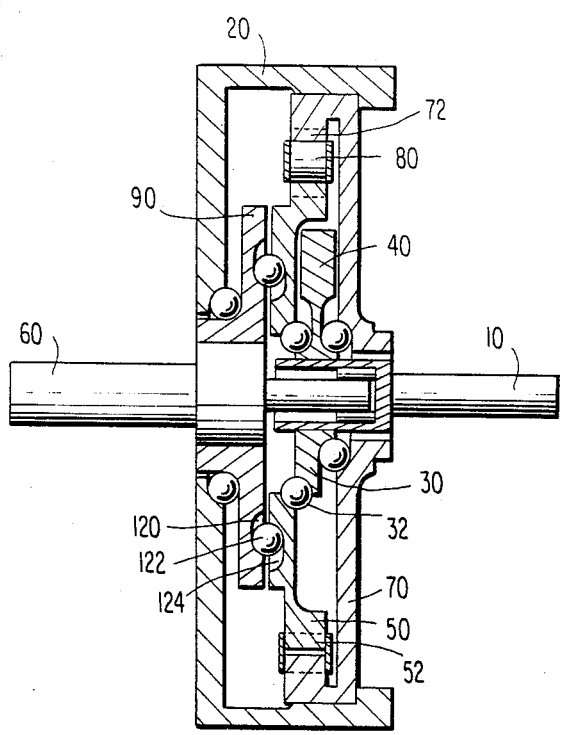
FIG. 3 is a sectional view of a transmission according to a third embodiment of the invention, where single stage reduction is obtained.

FIG. 3 discloses an analogous speed reduction mechanism wherein a single stage reduction is achieved. In particular, in FIG. 3, the input shaft 10 is provided with an eccentric cam 30, as in the previous embodiments, which initiates orbital movement on the part of the idler member 50.

Attached to the housing 20 is the stator 70 which is provided with surface 72 of hypotrochoidal curvature. The surface 52 of the idler 50 is, as in the previous embodiments, provided with epitrochoidal curvature conjugate to that of the hypotrochoid, and is in engagement therewith through the intermediary of a series of rollers 80. Accordingly, as the idler member 50 is caused to orbit by means of the cam 30, it is also caused to rotate reversely at a speed dependent upon the numbers of lobes on the respective surfaces 52, 72.

Joining the idler member 50 to the output member 90 in this embodiment is a constant velocity coupling consisting of elements 120-124. Specifically, cup-shaped recesses are formed in the output member 90 and the idler member 50 in a manner similar to that provided on the two idlers in the embodiment of FIG. 2. As is seen in FIG. 3, one of a series of balls 122 joint each confronting recess 120, 124, of which a plurality are provided. The constant velocity coupling formed as just described operates to transmit the rotational component of the compound motion of the idler 50 to the output shaft 60, such that a single speed reduction is obtained overall.

The speed reduction obtainable with the single stage transmission of FIG. 3 may be determined from the following formula, which is completely analogous to previous expressions (1), (2).

$$\frac{\text{input speed}}{\text{output speed}} = \frac{1}{1 - \left(\frac{n_1}{n_2}\right)} \quad (3)$$

Where:

$n_1$ equals the number of lobes on the stator, and $n_2$ equals the number of lobes on the idler surface 52.

The transmission of FIG. 3 is maintained in dynamic balance by means of a single counterweight 40.

Figure 7:
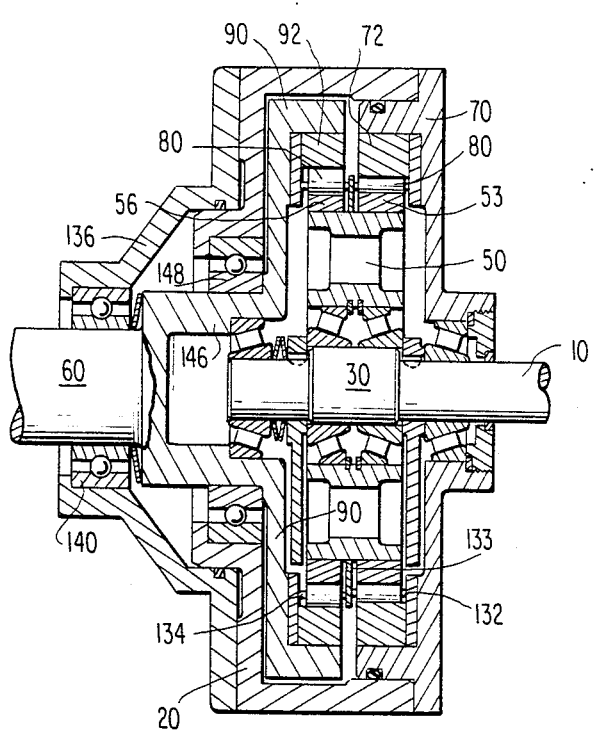
FIGS. 7 and 8 are sectional views depicting modifications of the basic design of FIG. 1.
Figure 8:
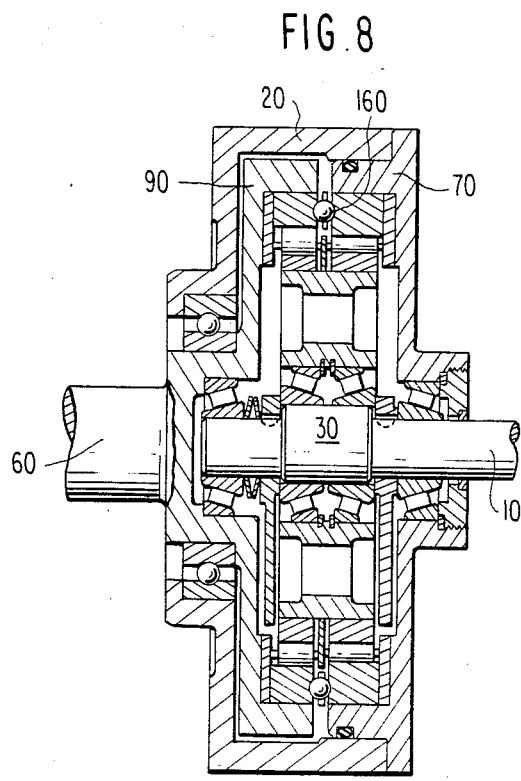

FIGS. 7 and 8 illustrate further exemplitive embodiments of the invention, each of which is a variant of the device according to FIG. 1. Each of these further embodiments achieves a two stage reduction, and thus equation (1) given above will be applicable in determining the overall speed ratio.

In the embodiment of FIG. 7, the various bearing functions are now assumed by more conventional ball and tapered roller bearings. The input shaft 10 is provided integrally with a cam portion 30 which operates via a set of bearings upon a unitary idler member 50 having trochoidal surfaces 53, 56 of different lobe numbers. A pair of conjugate trochoidal surfaces 72, 92 are provided on the stator 70 and output member 90, respectively. A plurality of rollers 80 operate between the respective conjugate surfaces, as before.

In this embodiment, the rollers 80 are caged by means of cylindrical retainer members 132, 134, which are generally provided in the form of cylindrical shells having substantially rectangular apertures formed therein at the positions for the rollers. The two cage members 132, 134 are prevented from rubbing against one another by means of an intermediate separating disk 133. Although shown as being in contact with the disk 133, the cage members actually are separated therefrom by a very small distance.

The output shaft 60 is integral with output disk or gear member 90. As shown, the shaft 60 and the gear member 90 are joined by means of an intermediate portion 146, which seats a first output bearing 148, along with housing 20. The housing 20 is also provided with an additional extension member 136, a portion which extends axially of the shaft 60.

The extension member 136 itself seats a bearing 140, which bears against the output shaft 60. As is obvious from FIG. 7, the additional output bearing 140 is of assistance when substantial transverse loads are applied to the transmission.

FIG. 8 discloses a gear box substantially similar to that just discussed in connection with FIG. 7. The primary difference between the two embodiments in that the FIG. 8 construction is designed specifically for construction with a large axial preloading. An annular thrust bearing 160 is arranged between the stator member 70 and the output member 90 within the housing 20. The annular thrust bearing 160 is seated by the respective members 70 and 90 by means of annular recesses formed therein. The thrust bearing 160 enables a large preload force to be exerted upon radially outward portions of the respective gear members, which may be achieved by any conventional means, including screws or the like bearing upon either the stator or the output member.

The operation of the embodiment of FIG. 8 is otherwise identical to that discussed in connection with FIGS. 1 and 7, and thus will not be further discussed herein.

Figure 9:
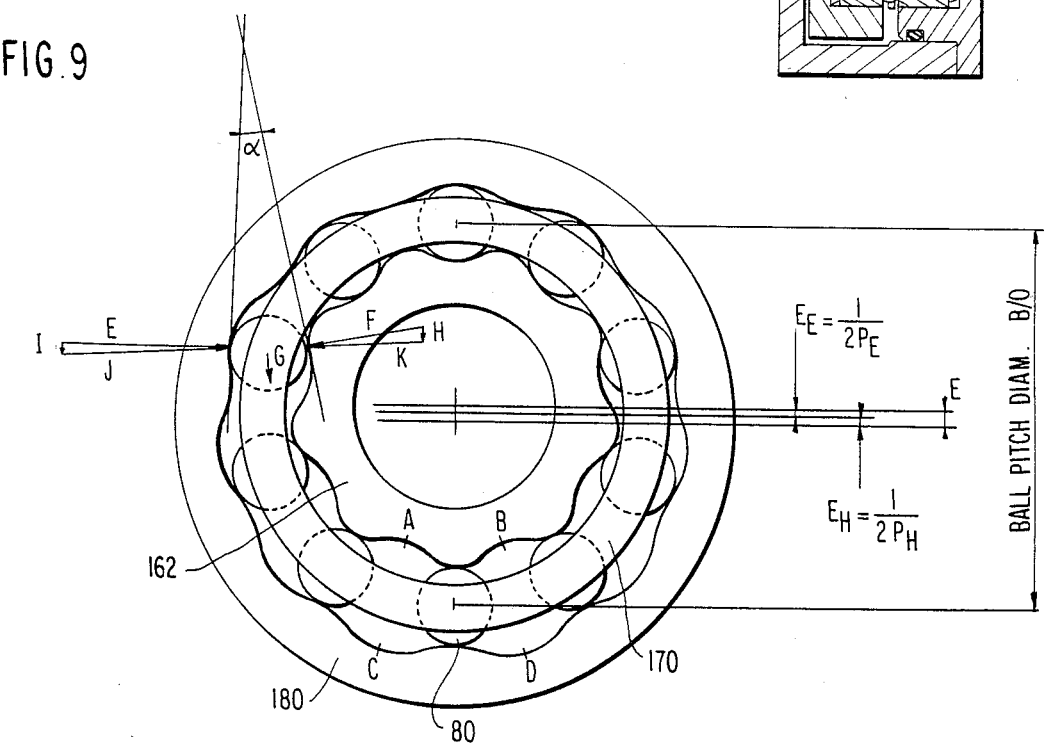
FIG. 9 is a longitudinal view of an example of a speed reducing mechanism according to the invention illustrating various relationships among the rollers and the driving and driven elements.

FIG. 9 is an end view through a transmission according to the present invention, useful for discussing various gearing relations of the speed reduction gears.

As can be seen from this figure, the curvature of the outer surface of the inner member is epitrochoidal, while that of the inner surface of the outer member is hypotrochoidal. Nine lobes are formed on the inner member, while eleven such lobes are formed on the outer member, which is presumed to be the stator in FIG. 9. Ten rolling elements rollingly transmit torque between the inner and the outer members, the rollers being separated by the prescribed distances by means of an intermediate retainer member. As is evident from FIG. 9, the centers of the inner and outer members are offset by a distance E, which is equal to the eccentricity of the driving cam.

Illustrated on the inner member 162 is an arc length AB, which is measured from peak to peak or from trough to trough of adjacent lobes. For a very precise gear box, the distance AB will be equal to CD, this latter distance being the corresponding arc length on the hypotrochoidal outer member 180. Of course, the arc lengths do not have to be precisely equal, and in practice will vary within limits.

Owing to the higher number of lobes on the hypotrochoidal member, the path length along the outer member 180 is 11/9 that of the inner member 162.

The dimensions of the epitrochoid, the hypotrochoid and retainer or cage member for the construction of FIG. 9 are given below. It should be noted that these expressions are general in nature, and are applicable to all of the presently disclosed embodiments.

Epitrochoid:

Major Diameter $= B/O + 1/P_E - U$

Minor Diameter $= B/O - 1/P_E - U$

Hypotrochoid:

Major Diameter $= B/O + 1/P_H + U$

Minor Diameter $= B/O - 1/P_H + H$

Retainer:

Minimum I.D. $= B/O + 2/P_E - U$

Maximum O.D. $= B/O - 2/P_H + U$

Average diameter $= B/O + 1/P_E - 1/P_H$

Where:
B = number of rollers
O = basic pitch
$P_E$ = theoretical epitrochoidal pitch
$P_H$ = theoretical hypotrochoidal pitch, and
U = roller diameter As discussed previously, as the inner member 162 is made to orbit, it will also be made to rotate recessionally due to the engagement thereof with the outer member 180 via the rollers 80. During this motion, the rollers circulate in the direction of the recession, while maintaining contact with both the inner and outer members. The formulae for the center line of the roller path may be described by the following parametric equations:

$$X = (A + B/2xP) \sin (T(1 - N/B)) + (N - B/2P) \sin (T) \quad (4)$$

$$Y = (A + B/2xP) \cos (T(1 - N/B)) + (N - B/2P) \cos (T) \quad (5)$$

where:
A = (B/O − B/P)/2
N = number of lobes
B = number of rollers
O = roller diametral pitch
P = theoretical pitch*
T = crank angle
*PE—pitch of epitrochoid
PH—pitch of hypotrochoid Finally in FIG. 9, force vectors have been drawn in and resolved for an individual roller 80, in order to demonstrate how accelerations may be placed on the rollers during operation of the device. In particular, the force vectors show that the roller can be controlled by "tilting" the two roller-lobe contact surfaces to affect accelerations on the rollers. Previously, the accelerations of the rolling element could only be caused by contact friction or the "push" of the cage or retainer device.

The roller accelerations as just described are made possible by slightly varying the inner and outer trochoidal shapes. Specifically, the theoretical pitches $P_E$ and $P_H$ of the gears are varied slightly to produce the "tilt" mentioned above.

As seen in FIG. 9, a pair of lines tangent to the roller surface and passing through the lines of contact between the roller and the inner and outer surfaces intersect in an angle $\alpha$, which may be termed the "squeeze angle", as the roller can be visualized as being urged forward from its illustrated position. Force vectors E and F are the driving forces exerted on the ball, and force vectors J and K extend through the roller center. Vectors E and F are perpendicular to the lines forming the angle $\alpha$ described above. The vectors as illustrated in FIG. 9 may be resolved to yield vectors I and H, which, when combined, produce the vector G which represents the acceleration or deceleration of a particular roller. It should be noted that the vectors I and H represent averaged values, and are not necessarily representative. For example, assuming the outer member to be the stator, the vector J would be colinear with the vector E, and the vector H would be approximately twice as large, the value of G of course being the same. Of course, the same would be true of vectors F and K if the inner member were to be selected as the stator, rather than the outer member 180. The value of the vector G is, of course, unchanged, regardless of which element is the stator, or whether average values are employed as above.

While the foregoing embodiments are presently preferred, it will be understood that numerous additional modifications may be made by those skilled in the art, and it is intended to cover in the appended claims all such modifications as fall within the true spirit and scope of the invention.

What is claimed is:
1. A speed reducing transmission comprising:

an input means for providing a rotaary input, an idler, means for converting said rotary input of said input means into orbital movement of said idler;

a stator;

an output member; and rolling elements disposed between said stator and said idler, said rolling elements comprising rollers, said idler and said stator each being formed with conjugate substantially trochoidal surfaces for engaging each of said rollers, said rollers freely rollingly transmitting torque between said stator and idler, said trochoidal surfaces being formed such that, in operation, all of said rollers are maintained in substantially continuous rolling contact with both said idler and said stator.

2. A speed reducer as claimed in claim 1, said trochoidal surfaces being provided as epitrochoidal and hypotrochoidal surfaces with said rollers operating therebetween.

3. A speed reducer as claimed in claim 1, said idler including first and second trochoidal surfaces, the first one of said idler trochoidal surfaces being in engagement with said stator trochoidal surface via said rollers, said output member having a trochoidal surface which is conjugate to said idler second trochoidal surface, and a second series of rollers disposed between said output member trochoidal surface and said idler second trochoidal surface, said rollers of said second series freely rollingly transmitting torque between said output member and said idler and being maintained in substantially continuous rolling contact with both said idler and said output member.

4. A speed reducer as claimed in claim 3, wherein said first and second idler trochoidal surfaces undergo joint rotary and orbital motion.

5. A speed reducer as claimed in claim 3, wherein said first and second idler trochoidal surfaces undergo joint rotary motion and independent orbital motion.

6. A speed reducer as claimed in claim 5, said idler being divided into two portions, each bearing one of said idler trochoidal surface, said portions being maintained 180° out of orbital phase with respect to one another, whereby dynamic imbalance brought about as a result of said orbital motion may be eliminated.

7. A speed reducer as claimed in claims 1, 4, 5 or 6, said converting means comprising cam means provided on said input, said cam means bearing upon said idler via intermediate bearing means.

8. A speed reducer as claimed in claim 1, said output member being coupled to said idler by a constant velocity coupling for transmitting a rotary component of said idler motion to said output member.

9. A speed reducer as claimed in claim 8, said constant velocity coupling comprising circular recesses formed in confronting surfaces of said idler and said output member, respectively, and further rolling elements disposed within said recesses.

10. A speed reducer as claimed in claim 3, wherein said first and second idler trochoical surfaces undergo rotary motion at different speeds and independent orbital motion.

11. A speed reducer as claimed in claim 10, said first and second idler trochoidal surfaces being coupled rotationally by means of trochoidal grooves formed in respective confronting surfaces of two respective halves of said idler, and rolling elements transmitting torque between said idler halves, whereby a speed reduction is obtained between said idler halves.

12. A speed reducer as claimed in claims 5 or 6, wherein said first and second idler trochoidal surfaces are rotationally coupled by a constant velocity coupling for transmitting a rotary component of the motion of a first idler half to a second idler half.

13. A speed reducer as claimed in claim 4, further including counterweight means for balancing imbalance forces generated as a result of said orbital motion.

14. A speed reducer as claimed in claim 1, wherein said stator is connected to a stationary casing, said casing extending axially of an output shaft connected to said output member, and bearing means between said extended casing and said output shaft.

15. A speed reducer as claimed in claim 1, further comprising thrust bearing means between said stator and said output member, and means for axially preloading said transmission.

16. A speed reducer as claimed in claim 1, said trochoidal surfaces being epitrochoidal and hypotrochoidal paired surfaces, an arc length between adjacent crests of lobes on said epitrochoidal surface being substantially equal to an arc length between adjacent crests of lobes on said hypotrochoidal surface.

17. A speed reducer as claimed in claim 1, said trochoidal surfaces being epitrochoidal and hypotrochoidal paired surfaces, wherein a theoretical pitch of said surfaces is varied so as to produce a force on said rolling elements for accelerating or decelerating said rolling elements as said elements roll between said epitrochoidal and hypotrochoidal surfaces.

18. A speed reducer as claimed in claim 1, said trochoidal surfaces comprising a series of lobes, a number of lobes on said stator trochoidal surface being greater by two than a number of lobes on said idler trochoidal surface, a number of rollers being one greater than said number of lobes on said idler trochoidal surface.

19. A speed reducer as claimed in claim 1, said trochoidal surfaces being formed so that said rollers travel a substantially trochoidal path.

20. A speed reducing transmission, comprising;

input means, gear means orbited by said input means, and a stator, said stator and said gear means each including a substantially trochoidal surface, said trochoidal surfaces comprising radially confronting conjugate trochoidal surfaces, a set of rollers radially entrained between and contacting both said trochoidal surfaces and freely rollingly transmitting torque therebetween, said rollers travelling in a substantially trochoidal path as they roll, and an output member driven by said gear means.

21. A speed reducer, comprising;

a first orbiting gear, a second orbiting gear, stator means engaging said first orbiting gear via a first set of rollers, and output means engaging said second orbiting gear via a second set of rollers in a number different from that of said first set of rollers, said first orbiting gear and said stator each having a substantially trochoidal gear surface in substantially constant freely rolling contact with each one of said first set of rollers, and said second orbiting gear and said output means each having a substantially trochoidal gear surface in substantially constant freely rolling contact with each one of said second set of rollers.

22. A speed reducer, comprising;

first and second orbitally driven gears, each of said gears including a substantially trochoidally shaped gear surface; an output gear, and a stator, said output gear and said stator respectively including gear surfaces of conjugate trochoidal curvature with respect to said trochoidally shaped gear surfaces of said second and first orbitally driven gears; and first and second sets of rollers respectively radially entrained between said trochoidal surfaces of said first orbitally driven gear and said stator and between said second orbitally driven gear and said output gear, said first and second sets of rollers being in substantially constant freely rolling torque transmitting contact with both trochoidal surfaces respectively entraining the same.

23. In a speed reducing transmission of the epicyclic type and including an input means, idler means, a stator and an output member, and means for converting a rotary input to said input means into an orbital movement of said idler means;

the improvement comprising a plurality of rollers disposed at least between said stator and said idler means, said idler means and said stator being formed with conjugate substantially trochoidal surfaces for engaging said rollers, said rollers transmitting torque between said stator and idler means, said conjugate trochoidal surfaces comprising one substantially epitrochoidal and one substantially hypotrochoidal surface, said epitrochoidal and hypotrochoidal surfaces being formed such that said rollers are maintained in substantially continuous rolling contact with both said epitrochoidal and hypotrochoidal surfaces.

24. In a speed reducing transmission of the type including an input means, idler means, a stator, an output member and means for converting a rotary input to said input means into an orbital motion of said idler means;

the improvement comprising a plurality of rollers disposed at least between said stator and said idler means, said idler means being provided with at least one gear surface of substantially trochoidal curvature, said stator being provided with a gear surface of substantially trochoidal curvature, each of said rollers rollingly contacting both said idler gear surface and said stator gear surface substantially constantly, said rollers being substantially the sole means transmitting torque between said idler means and said stator.

25. A transmission, comprising;

a first gear member for receiving an orbital input, and including a first gear surface of generally epitrochoidal curvature;

a stator member including a second gear surface of generally hypotrochoidal curvature and arranged to coact with said first gear surface;

a set of rollers arranged between said first and second gear surfaces, and arranged to transmit torque between said stator and said first gear member by rollingly engaging both said first and second gear surfaces simultaneously, said rollers rolling over the entire periphery of said stator and said first gear member as said first gear member is orbited.

26. A transmission as claimed in claim 25, wherein said set of rollers comprises substantially the sole means of transmitting torque between said stator and said first gear member.

27. A transmission as claimed in either of claims 25 and 26, further including a roller retainer having the sole purpose of maintaining a predetermined spacing between said rollers.

* * * * *